US010861192B2

(12) United States Patent
Nagai et al.

(10) Patent No.: US 10,861,192 B2
(45) Date of Patent: Dec. 8, 2020

(54) VEHICLE DEVICE, CALIBRATION RESULT DETERMINATION METHOD, AND NON-TRANSITORY STORAGE MEDIUM

(71) Applicant: JVCKENWOOD Corporation, Yokohama (JP)

(72) Inventors: Katsuyuki Nagai, Yokohama (JP); Takayuki Arase, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/787,078

(22) Filed: Feb. 11, 2020

(65) Prior Publication Data

US 2020/0175722 A1    Jun. 4, 2020

Related U.S. Application Data

(63) Continuation of application No. PCT/JP2018/011473, filed on Mar. 22, 2018.

(30) Foreign Application Priority Data

Sep. 12, 2017    (JP) ................................. 2017-175195

(51) Int. Cl.
*G06T 7/80* (2017.01)
*H04N 5/272* (2006.01)
(Continued)

(52) U.S. Cl.
CPC ............. *G06T 7/80* (2017.01); *H04N 5/2256* (2013.01); *H04N 5/23238* (2013.01);
(Continued)

(58) Field of Classification Search
None
See application file for complete search history.

(56) References Cited

U.S. PATENT DOCUMENTS 8,463,035 B2 * 6/2013 Bechtel .................. B60R 11/04
382/167
9,126,525 B2 * 9/2015 Lynam ................. G05D 1/0061
(Continued)

FOREIGN PATENT DOCUMENTS

JP      2016-070814    5/2016
WO     2013/074604    5/2013

OTHER PUBLICATIONS

International Search Report and Written Opinion for International Patent Application No. PCT/JP2018/011473 dated Jun. 12, 2018, 7 pages.
(Continued)

*Primary Examiner* — Reza Aghevli
(74) *Attorney, Agent, or Firm* — Amin, Turocy & Watson, LLP (57) ABSTRACT

A vehicle device includes a video acquisition unit configured to acquire videos captured by cameras configured to capture surroundings of a vehicle; a light emission controller configured to control light emission of a light beam pattern which is emitted by light emitting devices and with which the ground is irradiated at certain positions with respect to the vehicle; an image processing unit 24 configured to generate, using the videos acquired, a bird's-eye view video including the light beam pattern; a superimposing image generation unit configured to generate a superimposing image at a position corresponding to the light beam pattern included in the bird's-eye view video; and an image determination processing unit 27 configured to detect, in the bird's-eye view video, an overlapping portion of the superimposing image and an image of the light beam pattern and determine whether camera parameters for generating the bird's-eye view video are accurately calibrated.

7 Claims, 8 Drawing Sheets

(51) Int. Cl.
*B60R 1/00* (2006.01)
*H04N 5/225* (2006.01)
*H04N 5/232* (2006.01)
*H04N 5/262* (2006.01)

(52) U.S. Cl.
CPC .......... *H04N 5/2628* (2013.01); *H04N 5/272* (2013.01); *B60R 1/00* (2013.01); *B60R 2300/105* (2013.01); *B60R 2300/304* (2013.01); *B60R 2300/607* (2013.01); *G06T 2207/10016* (2013.01); *G06T 2207/30252* (2013.01)

(56) References Cited

U.S. PATENT DOCUMENTS

| | | | | |
|---|---|---|---|---|
| 9,800,794 B2* | 10/2017 | Weber | | B60R 1/00 |
| 9,902,341 B2* | 2/2018 | Oshima | | B60R 11/04 |
| 9,911,050 B2* | 3/2018 | Lynam | | B60W 50/0098 |
| 10,140,775 B2* | 11/2018 | Oba | | G06T 3/4038 |
| 2008/0106591 A1* | 5/2008 | Border | | H04N 7/144 |
| | | | | 348/14.01 |
| 2008/0106628 A1* | 5/2008 | Cok | | H04N 7/144 |
| | | | | 348/333.01 |
| 2008/0106629 A1* | 5/2008 | Kurtz | | H04N 7/144 |
| | | | | 348/333.01 |
| 2008/0165267 A1* | 7/2008 | Cok | | H04N 7/144 |
| | | | | 348/333.01 |
| 2010/0303349 A1* | 12/2010 | Bechtel | | B60R 11/04 |
| | | | | 382/165 |
| 2012/0050074 A1* | 3/2012 | Bechtel | | G06K 9/209 |
| | | | | 340/988 |
| 2012/0062743 A1* | 3/2012 | Lynam | | H04N 5/23293 |
| | | | | 348/148 |
| 2014/0354811 A1* | 12/2014 | Weber | | B60R 1/00 |
| | | | | 348/148 |
| 2016/0042238 A1* | 2/2016 | Lynam | | H04N 5/247 |
| | | | | 701/45 |
| 2016/0217625 A1* | 7/2016 | Oba | | G06T 3/4038 |
| 2017/0011539 A1* | 1/2017 | Oshima | | G03B 37/04 |
| 2017/0061622 A1 | 3/2017 | Sakano et al. | | |
| 2018/0197024 A1* | 7/2018 | Lynam | | B60W 10/18 |

OTHER PUBLICATIONS

Extended European Search Report for European Patent Application No. 18856233.4 dated Jul. 7, 2020.

* cited by examiner

VEHICLE DEVICE, CALIBRATION RESULT DETERMINATION METHOD, AND NON-TRANSITORY STORAGE MEDIUM

CROSS-REFERENCE TO RELATED APPLICATIONS

This application is a continuation of PCT International Application No. PCT/JP2018/011473 filed in Japan on Mar. 22, 2018, which claims priority to and incorporates by references the entire contents of Japanese Patent Application No. 2017-175195 filed in Japan on Sep. 12, 2017.

FIELD

The present application relates to a vehicle device, a calibration result determination method, and a non-transitory storage medium.

BACKGROUND

For safety driving of a vehicle such as an automobile, a technique has been used in which cameras that image surroundings of the vehicle are mounted on the vehicle and taken images are processed and displayed to allow a driver to easily recognize the images to thereby accurately check a blind spot for the driver and a place hardly viewed from the driver. Initially, a camera that monitors a rear view of the vehicle had been mounted on the vehicle, thereafter, cameras that monitors a front view of the vehicle and side views of the vehicle were mounted. The images obtained by those cameras are displayed to support the driver.

In recent years, a technique has been widely used in which an image processing is performed on images obtained by cameras that are disposed at four positions (the front, the rear, and the right and left sides of the vehicle) and have a super wide angle (e.g., 180 degrees) and a high resolution (e.g., one million pixels or more) to generate a bird's-eye view video viewed from above the vehicle, and the bird's-eye view video is displayed. Such a technique allows a driver to accurately check a blind spot for the driver and a place hardly viewed from the driver when garaging, parallel parking, and the like are performed, for example.

The device that generates the bird's-eye view video and displays the bird's-eye view video performs a viewpoint conversion processing and a synthesizing processing on the videos captured by the cameras at four positions to generate the video viewed from above the vehicle. When the device that generates the bird's-eye view video converts the videos captured by the cameras at four positions into the video viewed from above the vehicle, parameters used for the conversion of the images are determined on an assumption that a position of a virtual camera above the vehicle is determined and positions of the actual cameras are definitely determined. It is, however, actually very difficult to mount the cameras at four positions with no errors, and parameters of each camera are not always strictly the same as those designed. For correctly performing the viewpoint conversion processing and the synthesizing processing, it is, thus, necessary to not only adjust a mounted orientation and an angle of view of each of the cameras but also to perform a calibration (correction) for correcting distortion and the like in the conversion of the image in the device that generates the bird's-eye view video.

Conventionally, a technique has been available that makes it possible to perform a calibration even in a situation where a loaded condition of a vehicle is changed and to perform a calibration by precisely estimating parameters of all cameras without using parallelism of the vehicle with respect to white lines, for example (e.g., Japanese Laid-open Patent Publication No. 2016-070814).

SUMMARY

In general, the calibration is performed on camera parameters used for generating the bird's-eye view video by evaluating an imaging result of a marker, a calibration chart, or the like disposed at a designated place. Specifically, for example, a certain pattern precisely disposed at a predetermined position is imaged by cameras at four positions and the camera parameters are calibrated such that the videos actually captured are the same as those captured by the designed cameras.

The most important thing on converting the images into the bird's-eye view video is that no distortion occurs at boundary areas of the images of respective cameras in a synthesized image. For example, in FIG. 11, the most important thing is that white lines 91 and 92 that are present at places 1 m away from a vehicle 81 correctly continue in the vicinities of video boundaries 93 to 96 of the respective cameras in the synthesized bird's-eye view video with no shifts and distortions, and the bird's-eye view video makes it possible for a user to recognize that the white lines 91 and 92 are 1 m away from the vehicle 81 in parallel with the vehicle 81.

Figure 11:
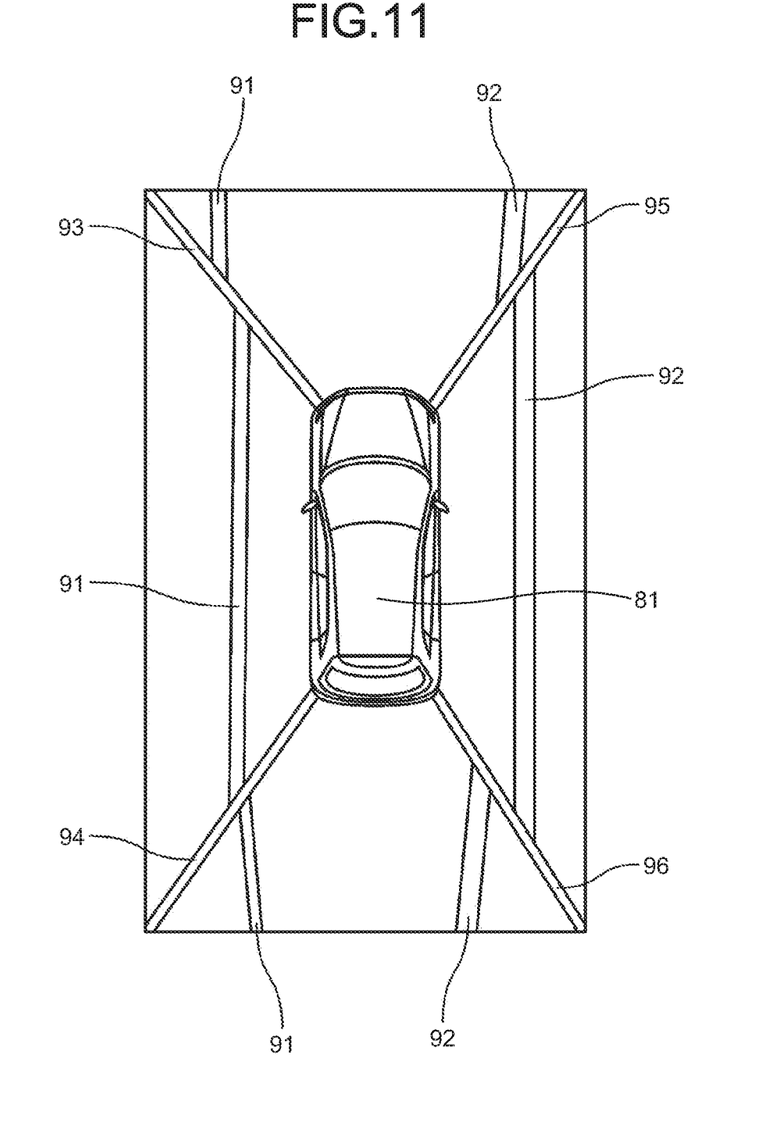
FIG. 11 is a diagram for explaining the bird's-eye view video.

For example, in inspection at a car dealer and the like, after a certain calibration using a marker, a calibration chart, or the like, white lines are drawn (or gummed tapes are attached) at certain positions around a vehicle, and an bird's-eye view video including the white lines (or the lines formed of the gummed tapes, hereinafter this expression is omitted) imaged by the respective cameras is generated and displayed, and it is checked that the displayed white lines are displayed as a normal image with no distortions and shifts. For example, in a case where the bird's-eye view video is displayed while white lines are drawn on the right and left sides of the vehicle in parallel with the vehicle, when, as illustrated in FIG. 11, the white lines 91 and 92 are distorted and shifted at the video boundaries 93 to 96 in synthesized portions in the displayed bird's-eye view video, the camera parameters need to be adjusted again since the calibration is not correctly performed.

It takes much time to draw the white lines or the like in parallel with the vehicle at certain positions as described above on every checking work after the calibration in the inspection at the car dealer and the like. In addition, for checking the bird's-eye view video after the calibration at the place where the white lines are preliminarily present at positions that make it possible to be imaged by the cameras, the vehicle needs to be stopped such that a positional relation between the white lines and the vehicle is constant, which is very difficult.

The technique in Japanese Laid-open Patent Publication No. 2016-070814 requires that linear structural objects more than a certain number are imaged by the respective cameras in the calibration. For example, it is assumed that white lines on a road are imaged during running. Even when the technique described in Japanese Laid-open Patent Publication No. 2016-070814 is applied to the inspection at the car dealer, the linear structural objects need to be made by drawing white lines or attaching gummed tapes at certain positions around the vehicle, or the vehicle to be inspected needs to be moved to a place where the linear structural objects such as white lines are preliminarily present at positions that make it possible to be imaged by the cameras in the conventional manner.

In the inspection at the car dealer, white lines and the like serving as the linear structural objects used for the calibration may be hardly recognized depending on ambient brightness or a color of the ground or a floor surface. This case may take a time to preliminarily prepare tapes of different colors, for example.

In the inspection at the car dealer, the checking work of the bird's-eye view video after the calibration using a marker, a calibration chart, or the like is performed in a visual manner. The checking result is, thus, unstable. The linear structural objects used for checking the bird's-eye view video are actually prepared by drawing white lines, attaching the gummed tapes, or the like by a manual work every time. This causes variation in recognizing the linear structural objects in the bird's-eye view video after the calibration.

A vehicle device, a calibration result determination method, and a non-transitory storage medium are disclosed.

According to one aspect, there is provided a vehicle device, comprising: a video acquisition unit configured to acquire videos captured by cameras configured to capture surroundings of a vehicle; a light emission controller configured to control light emission of a light beam pattern which is emitted by light emitting devices and with which the ground or a floor surface is irradiated at predetermined positions with respect to the vehicle; an image processing unit configured to generate, using the videos acquired by the video acquisition unit, a bird's-eye view video including the light beam pattern the light emission of which is controlled by the light emission controller; a superimposing image generation unit configured to generate a superimposing image at a position corresponding to the light beam pattern included in the bird's-eye view video generated by the image processing unit; and an image determination processing unit configured to detect, in the bird's-eye view video on which the superimposing image generated by the superimposing image generation unit is superimposed, an overlapping portion of the superimposing image and an image of the light beam pattern to determine whether camera parameters for generating the bird's-eye view video are accurately calibrated.

According to one aspect, there is provided a calibration result determination method that determines a calibration result of camera parameters for generating a bird's-eye view video of a vehicle, the calibration result determination method comprising: controlling light emission of a light beam pattern which is emitted by light emitting devices and with which the ground or a floor surface is irradiated at predetermined positions with respect to the vehicle: generating, using videos captured by cameras configured to capture surroundings of the vehicle, a bird's-eye view video including the light beam pattern the light emission of which is controlled at the controlling; generating a superimposing image at a position corresponding to the light beam pattern included in the bird's-eye view video generated at the generating of the bird's-eye view video; and detecting, in the bird's-eye view video on which the superimposing image generated at the generating of the superimposing image is superimposed, an overlapping portion of the superimposing image and an image of the light beam pattern to determine whether the camera parameters for generating the bird's-eye view video are accurately calibrated.

According to one aspect, there is provided a non-transitory storage medium that stores a computer program that causes a computer mounted on a vehicle to perform processing comprising: controlling light emission of a light beam pattern which is emitted by light emitting devices and with which the ground or a floor surface is irradiated at predetermined positions with respect to the vehicle: generating, using videos captured by cameras configured to capture surroundings of the vehicle, a bird's-eye view video including the light beam pattern the light emission of which is controlled at the controlling; generating a superimposing image at a position corresponding to the light beam pattern included in the bird's-eye view video generated at the generating of the bird's-eye view video; and detecting, in the bird's-eye view video on which the superimposing image generated at the generating of the superimposing image is superimposed, an overlapping portion of the superimposing image and an image of the light beam pattern to determine whether the camera parameters for generating the bird's-eye view video are accurately calibrated.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Figure 1:
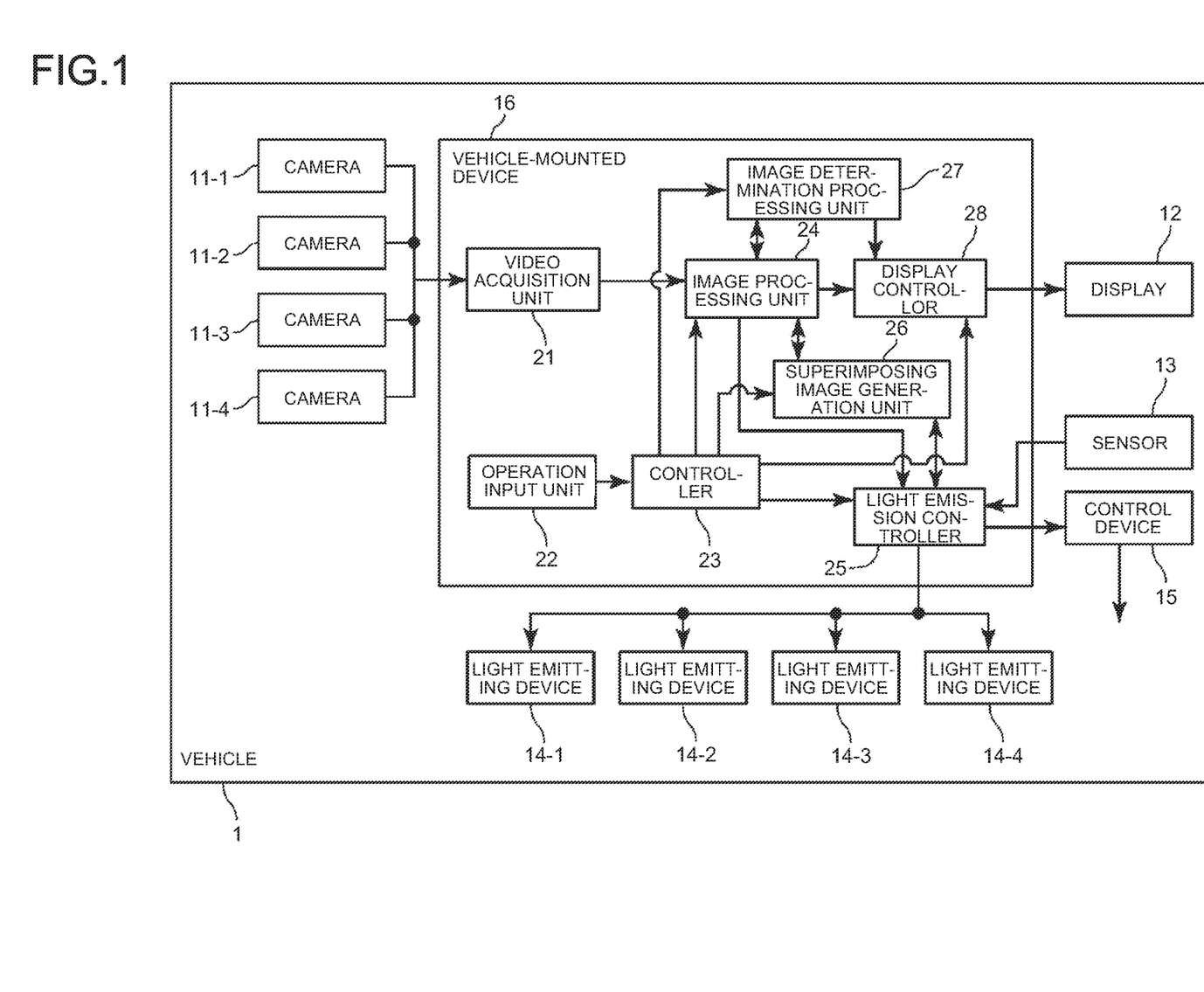
FIG. 1 is a diagram illustrating a functional structure of a calibration result determination system.

With reference to FIGS. 1 to 10, embodiments of a vehicle device according to the present application is described below FIG. 1 is a functional block diagram illustrating a functional structure of a calibration result determination system including a vehicle-mounted device according to the embodiments of the application.

The calibration result determination system includes cameras 11-1 to 11-4, a display 12, a sensor 13, light emitting devices 14-1 to 14-4, a control device 15, and a vehicle-mounted device 16, and is mounted on a vehicle 1. The vehicle-mounted device 16 corresponds to the vehicle device. The calibration result determination system can commonly use many of constituent elements that are conventionally provided to the vehicle 1 and used for generating and displaying a surrounding video of the vehicle 1 and a bird's-eye view video obtained by synthesizing processing for supporting a driver.

Each of the cameras 11-1 to 11-4 includes a camera that monitors a rear view of the vehicle 1, a camera that monitors a front view of the vehicle 1, and cameras that monitor right and left side views of the vehicle 1, for example. Each of the cameras 11-1 to 11-4 is mounted at a certain position of the vehicle 1 so as to be capable of imaging a video all around the vehicle 1 based on known design information preliminarily determined, and captures a surrounding video of the vehicle 1. Each of the cameras 11-1 to 11-4 preferably has a super wide angle (e.g., 180 degrees) and a high resolution (e.g., one million pixels or more). The videos obtained by the cameras 11-1 to 11-4 are subjected to an image processing by the vehicle-mounted device 16, which is described later, and displayed on the display 12 for supporting the driver. Specifically, the videos obtained by the cameras 11-1 to 11-4 are subjected to the image processing by the vehicle-mounted device 16. Thereafter, each of the videos of the front view, the rear view, and the right and left side views of the vehicle 1 are displayed by the display 12, thereby making it possible to support the driver to check a blind spot region for the driver. The vehicle-mounted device 16 performs a viewpoint conversion processing and a synthesizing processing on each of the videos captured by the cameras 11-1 to 11-4, thereby generating an bird's-eye view video and making it possible to cause the display 12 to display the bird's-eye view video. Hereinafter, the cameras 11-1 to 11-4 are collectively described as the camera 11 when they do not need to be particularly differentiated from one another.

The display 12 includes a liquid crystal display, for example. The display 12 displays each of the videos of the front view, the rear view, and the right and left side views of the vehicle 1 for supporting the driver to check the blind spot region for the driver and the bird's-eye view video that are generated by the vehicle-mounted device 16, which is described later, with messages as needed. The display 12 receives a determination result of whether the calibration is correctly performed, which is obtained from a processing by the vehicle-mounted device 16, which is described later, and displays the determination result.

The sensor 13 includes a sensor that detects surrounding brightness of the vehicle 1 and supplies the detection result to the vehicle-mounted device 16. A sensor that detects information necessary for other unillustrated operation of the vehicle 1 may be included in the sensor 13 or used as the sensor 13. A sensor for automatic lighting may be used as the sensor 13 for detecting the surrounding brightness of the vehicle 1, for example.

Figure 2:
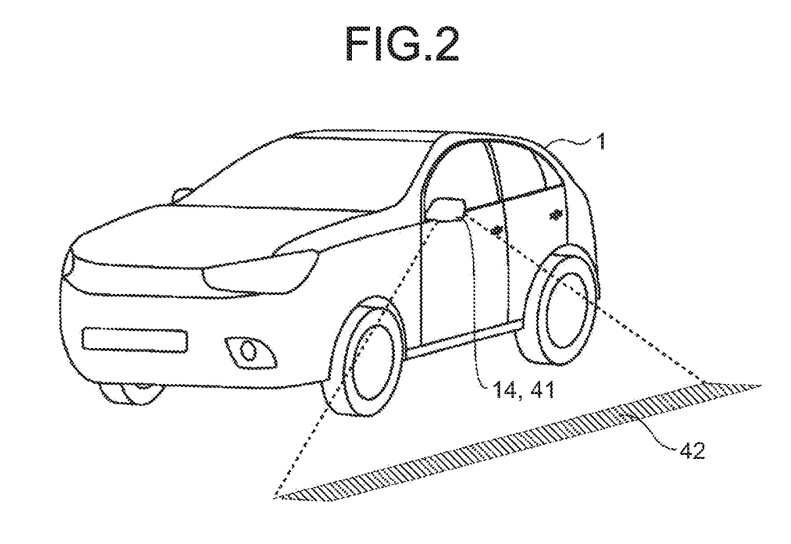
FIG. 2 is a diagram for explaining a light beam pattern 42.

The light emitting devices 14-1 to 14-4 are arranged at such positions that they can irradiate the ground (floor surface) at least on the right and left sides of the vehicle 1 with a linear light beam pattern in parallel with the right and left sides of the vehicle 1. As illustrated in FIG. 2 as a specific example, some of the light emitting devices 14-1 to 14-4 can be provided by being mounted to lower portions of door mirrors 41 on the right and left sides of the vehicle 1. Each of the light emitting devices 14-1 to 14-4 irradiates a linear light beam pattern 42 parallel to the right and left sides of the vehicle 1 on the ground based on the control of the vehicle-mounted device 16. The light emitting devices 14-1 to 14-4 may be provided on at least the right and left sides of the vehicle 1. The light emitting devices 14-1 to 14-4 are preferably provided either the front side or the rear side of the vehicle 1 or both of the front side and the rear side of the vehicle 1, and preferably irradiate the linear light beam pattern 42 parallel to the right and left sides of the vehicle 1 on the ground of either the front side or the rear side of the vehicle 1, or of the front side and the rear side of the vehicle 1. The color of the light beam pattern 42 emitted by the light emitting devices 14-1 to 14-4 is a complementary color or a color similar to the complementary color of the ground. The color and luminance (a color temperature) are controlled by a light emission controller 25, which is described later, of the vehicle-mounted device 16. Hereinafter, the light emitting devices 14-1 to 14-4 are collectively described as the light emitting device 14 when they do not need to be particularly differentiated from one another.

Figure 3:
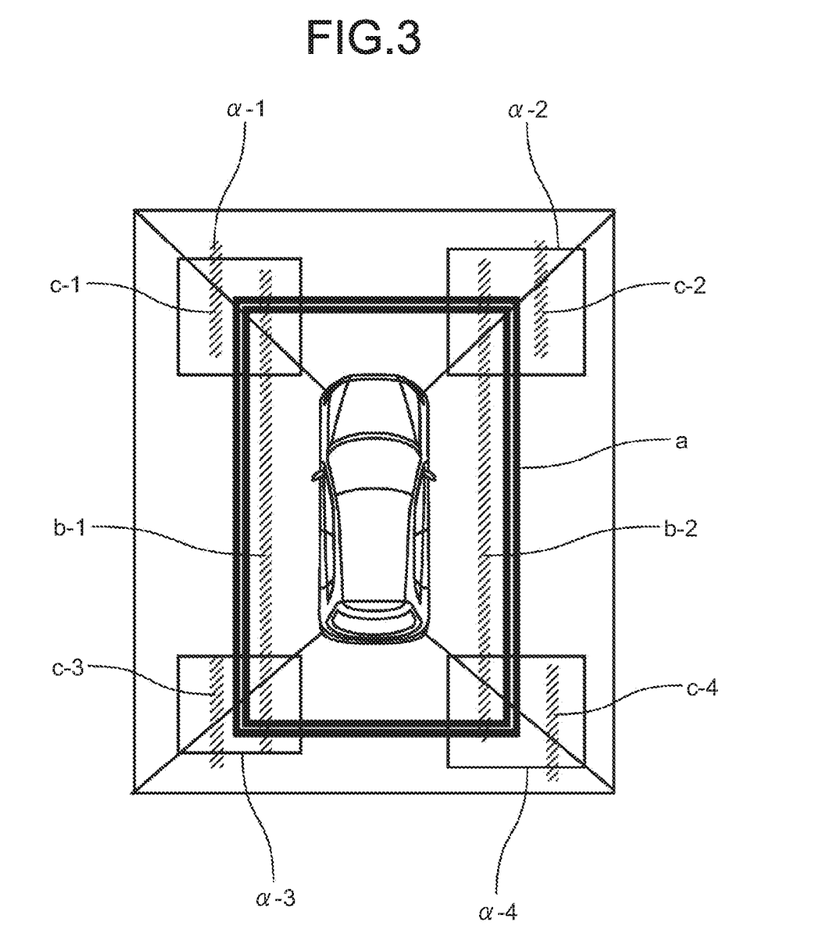
FIG. 3 is a diagram for explaining the light beam pattern 42.

With reference to FIG. 3, irradiation examples of the light beam pattern 42 are described. The most important video in determining whether the calibration is correctly performed is video in the vicinity of the synthesized boundary in the bird's-eye view video. Any shape of the light beam pattern 42 with which the light emitting device 14 performs irradiation may be acceptable as long as the light beam pattern 42 includes a straight line crossing over a boundary line at least in all of the boundary regions (e.g., positions corresponding to respective rectangles $\alpha$-1 to $\alpha$-4 in FIG. 3). The light beam pattern 42 may be composed of a plurality of straight lines or a graphic such as a rectangle, for example. As exemplarily illustrated in FIG. 3, the light beam pattern 42 may be a rectangle with a constant distance from the vehicle 1 around the vehicle 1, straight lines b-1 and b-2 with a length longer than the length of the vehicle 1 in parallel with the side of the vehicle 1, or straight lines c-1 to c-4 that cross over the boundary lines in all of the boundary regions.

Referring back to FIG. 1, the control device 15 controls operation of respective units (which may include unillustrated units) of the vehicle 1. For example, when the light emitting devices 14 are mounted at the lower portions of the door mirrors 41 on the right and left sides as described with reference FIG. 2, and the respective units of the vehicle 1 need to be operated for processing to determine whether the calibration is correctly performed, the control device 15 performs necessary processing such as a control of an open-close operation of the door mirrors 41 based on the control from the vehicle-mounted device 16.

The vehicle-mounted device 16 includes a video acquisition unit 21, an operation input unit 22, a controller 23, an image processing unit 24, the light emission controller 25, a superimposing image generation unit 26, an image determination processing unit 27, and a display controller 28. The vehicle-mounted device 16 may include known various display systems, a car navigation system, or a car audio system, for example, besides those described above.

The video acquisition unit 21 acquires the videos captured by the cameras 11 and supplies the acquired videos to the image processing unit 24.

The operation input unit 22 includes a touch panel, buttons, keys, or a receiving unit that receives a signal from a remote controller, for example. The operation input unit 22 acquires the user's operation input and the supplies the acquired operation input to the controller 23.

The controller 23 controls the operation of the vehicle-mounted device 16 based on the user's operation input supplied from the operation input unit 22. The controller 23 controls the image processing by the image processing unit 24, light emission control performed by the light emission controller 25 on the light emitting devices 14, a generating processing of a superimposing image by the superimposing image generation unit 26, a synthesizing processing performed by the image processing unit 24 on the superimposing image, and a determination processing by the image determination processing unit 27 to determine whether the calibration is correctly performed, which are described later, for example. Details of a checking processing of the calibration result is described later with reference to the flowchart in FIG. 10.

The controller 23 controls a processing necessary for known calibration that calibrates the camera parameters in generation of the bird's-eye view video based on the user's operation input supplied from the operation input unit 22. Specifically, a certain marker or a calibration chart precisely disposed at a predetermined position is imaged, and the controller 23 calibrates the camera parameters used for generating the bird's-eye view video by the image processing unit 24 such that the actually captured videos are the same as the videos captured by the designed cameras 11 based on the user's operation input supplied from the operation input unit 22.

The image processing unit 24 performs a processing to remove distortions in the videos using a known distortion function on the videos which are captured by the respective cameras 11 with a super wide angle and a high resolution and which are supplied from the video acquisition unit 21 based on the control of the controller 23. As a result, for example, the image processing unit 24 generates respective images of the front view, the rear view, and the right and left side views of the vehicle 1, which supports the driver to check a blind spot region for the driver. The image processing unit 24 performs the viewpoint conversion processing on all of the videos of the front view, the rear view, and the right and left side views of the vehicle 1 which are captured with a super wide angle and a high resolution and which are supplied from the video acquisition unit 21 based on known design values for mounting the cameras and the like, and performs the synthesizing processing thereon to thereby generate the bird's-eye view video viewed from above the vehicle 1. The viewpoint conversion processing and the synthesizing processing are achieved by a known technique that allocates a luminance value of a specific pixel in a video captured by the camera 11 to another specific pixel corresponding to a video viewed from a virtual bird's-eye view point using a known geometric transformation formula of the camera, for example.

When each of the parameters used for generating the bird's-eye view video are calibrated, the image processing unit 24 performs a known processing necessary for the calibration based on the control of the controller 23.

When a checking processing of the calibration result is performed, the image processing unit 24 performs the viewpoint conversion processing and the synthesizing processing on the images supplied from the video acquisition unit 21 based on the control of the controller 23, thereby generating the bird's-eye view video. The image processing unit 24 supplies the generated bird's-eye view video to the light emission controller 25 and the superimposing image generation unit 26, and superimposes a superimposing image generated by the superimposing image generation unit 26, which is described alter, on the bird's-eye view video, and supplies the resulting video to the image determination processing unit 27 and the display controller 28.

The light emission controller 25 controls the color, the luminance, and the like of the light beam pattern 42 emitted by the light emitting device 14 based on the control of the controller 23. When the checking processing of the calibration result is performed, the light emission controller 25 receives a control signal for light emission from the controller 23, acquires the synthesized bird's-eye view video from the image processing unit 24, detects a color of the ground (floor surface) at the surrounding of the vehicle 1, and causes the light emitting device 14 to emit light having a complementary color or a color as similar as possible to the complementary color. The light beam pattern 42 with which the ground (floor surface) is irradiated is, thus, easily recognized on the bird's-eye view video, thereby achieving stable recognition of the light beam pattern 42 in the checking processing of the calibration result, which is described later. The light emission controller 25 controls emitted light intensity based on information about surrounding brightness of the vehicle 1 supplied from the sensor 13 or based on luminance information about the bird's-eye view video supplied from the image processing unit 24. In this case, the emitted light intensity of the light beam pattern 42 is preferably controlled based on the luminance information about the luminance in the vicinity of the video boundary of the synthesized bird's-eye view video. This makes it possible to prevent the light beam pattern 42 from being hardly recognized on the synthesized bird's-eye view video due to excessively weak or strong emitted light intensity.

When the light emitting devices 14 are disposed at the lower portions of the door mirrors 41 on the right and left sides as described with reference FIG. 2 and each of the units of the vehicle 1 need to be operated for processing to determine whether the calibration is correctly performed, the light emission controller 25 controls the control device 15 to operate the respective units (e.g., the door mirrors 41) of the vehicle 1, thereby achieving the irradiation with the light beam pattern 42 at the certain positions as described with reference to FIG. 3.

During the irradiation with the light beam pattern 42 by the light emitting device 14, the light emission controller 25 acquires the synthesized bird's-eye view video from the image processing unit 24, determines whether the light beam pattern 42 emitted on the ground (floor surface) around the vehicle 1 is easily recognized on the ground (floor surface), and controls the color and the luminance of the light beam pattern 42 based on the determination result.

The superimposing image generation unit 26 generates a superimposing image 62 that is composed of straight lines or a rectangle, and that overlaps with, by a certain width, or shifted from, by a certain width, the light beam pattern 42 emitted by the light emitting device 14 and described with reference to FIG. 3, when the camera parameters used for bird's-eye view video generation are correctly calibrated. The color and a transparency level of the straight lines or the rectangle included in the superimposing image 62 are set such that, as exemplarily illustrated in FIG. 4, an overlapping portion 63 is easily recognized in a state where the superimposing image 62 is superimposed on an image 61 of the light beam pattern included in the bird's-eye view video. For a specific example, when the color of the light beam pattern 42 is red, the color of the superimposing image 62 is set to blue having some transparency level, the overlapping portion 63 is displayed in purple. As a result, the overlapping portion 63 is easily recognized.

Figure 4:
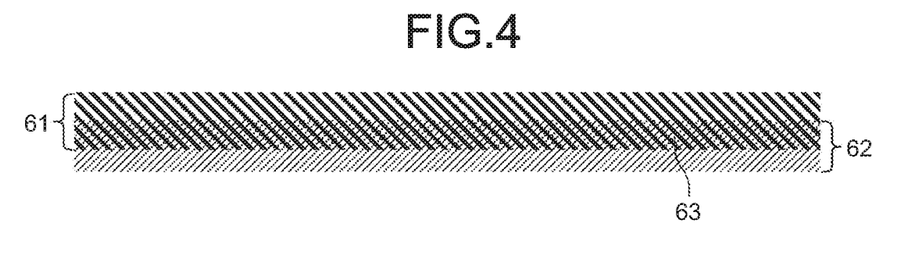
FIG. 4 is a diagram for explaining a display of an image 61 of the light beam pattern, a superimposing image 62, and an overlapping portion 63.
Figure 5:
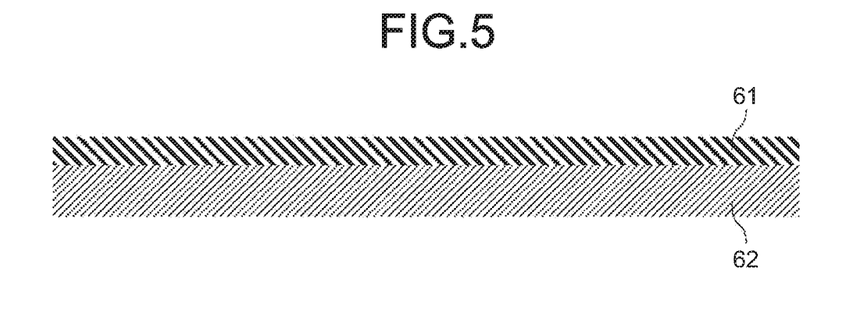
FIG. 5 is a diagram for explaining the display of the image 61 of the light beam pattern, the superimposing image 62, and the overlapping portion 63.
Figure 6:
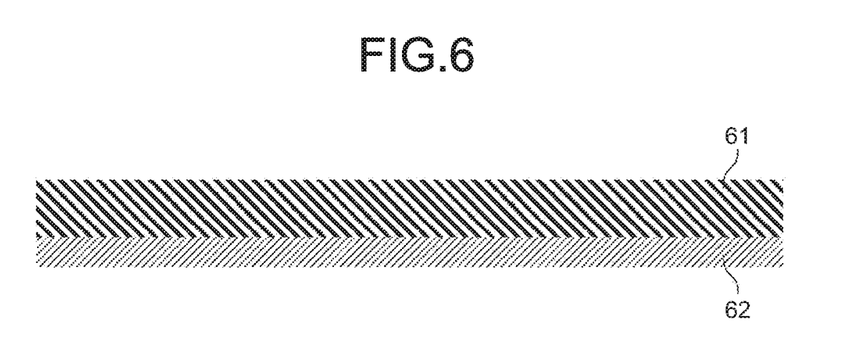
FIG. 6 is a diagram for explaining the display of the image 61 of the light beam pattern, the superimposing image 62, and the overlapping portion 63.

When the transparency level of the overlapping image 62 is too low or the overlapping image 62 has no transparency, as illustrated in FIG. 5, only the superimposing image 62 can be recognized in a portion where the image 61 of the light beam pattern and the superimposing image 62 overlap, which is to be recognized as the overlapping portion 63. In contrast, when the transparency level of the superimposing image 62 is too high, as illustrated in FIG. 6, only the image 61 of the light beam pattern can be recognized in a portion where the image 61 of the light beam pattern and the superimposing image 62 overlap, which is to be recognized as the overlapping portion 63. In order to avoid such cases, the superimposing image generation unit 26 controls the transparency level of the superimposing image 62 such that the overlapping portion 63 where the image 61 of the light beam pattern and the superimposing image 62 overlap can be recognized as a mixed color of the color of the image 61 of the light beam pattern and the color of the superimposing image 62 as described with reference to FIG. 4.

As described above, since the color of the light beam pattern 42 is changed in accordance with the color of the ground (floor surface) and the surrounding brightness, the superimposing image generation unit 26 inquires the light emission controller 25 for details of the light emission control of the light beam pattern 42 and decides the color and the transparency level of the superimposing image 62 based on the inquire result.

Referring back to FIG. 1, the image determination processing unit 27 acquires, from the image processing unit 24, the video on which the superimposing image 62 generated by the superimposing image generation unit 26 is superimposed, and image-recognizes the overlapping portion 63 where the image 61 of the light beam pattern and the superimposing image 62 overlap, thereby determining whether the calibration is correctly performed.

Figure 7:
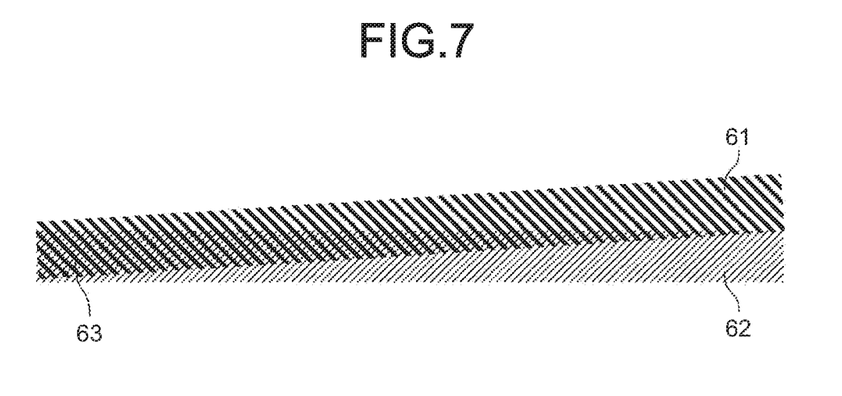
FIG. 7 is a diagram for explaining the display of the image 61 of the light beam pattern, the superimposing image 62, and the overlapping portion 63.
Figure 8:
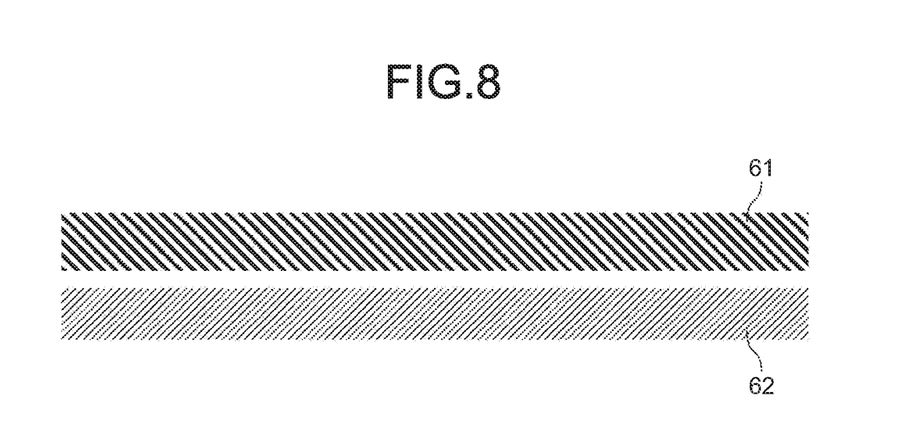
FIG. 8 is a diagram for explaining the display of the image 61 of the light beam pattern, the superimposing image 62, and the overlapping portion 63.

Specifically, when the calibration is correctly performed, for example, the overlapping portion 63 where the image 61 of the light beam pattern and the superimposing image 62 overlap is clearly recognized as a region which has the mixed color of the color of the image 61 of the light beam pattern and the color of the superimposing image 62, as described with reference FIG. 4, and which has a certain width preliminarily determined by a design value. In contrast, when the calibration is not correctly performed and distortion occurs in the image, the width of the overlapping portion 63 where the image 61 of the light beam pattern and the superimposing image 62 overlap is not constant as illustrated in FIG. 7. When the calibration is not correctly performed and shift occurs in the image, the overlapping portion 63 where the image 61 of the light beam pattern and the superimposing image 62 overlap does not exist as illustrated in FIG. 8, or the width of the overlapping portion 63 is narrower or wider than a theoretical value (a certain number of dots preliminarily determined by a design value) of the width of the overlapping portion 63 even when the overlapping portion 63 exists.

Figure 9:
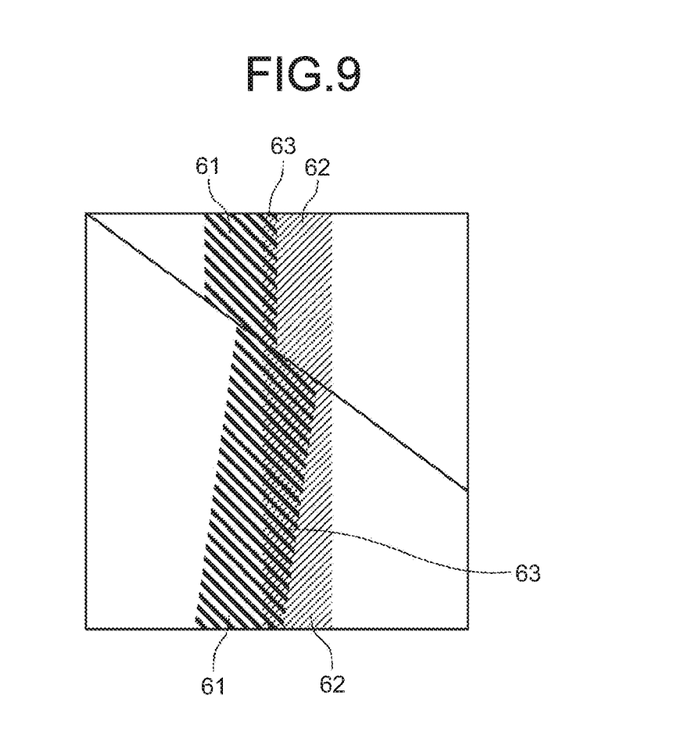
FIG. 9 is a diagram for explaining a video in the vicinity of a synthesized boundary of an bird's-eye view video.

With reference to FIG. 9, the following describes the overlapping portion 63 in the area corresponding to the boundary of the synthesized image illustrated with the rectangles α in FIG. 3. In FIG. 9, the image 61 of the light beam pattern is displayed in such a manner that the image 61 does not correctly continue at the boundary of the synthesized image. The width of the overlapping portion 63 on the upper side of the boundary in the display screen is narrower than the theoretical value. It is, thus, recognized that shift occurs in the video of the corresponding area. The width of the overlapping portion 63 on the lower side of the boundary in the display screen is not constant. It is, thus, recognized that distortion occurs in the video of the corresponding area. The image determination processing unit 27 supplies those determination results to the display controller 28. The determination results by the image determination processing unit 27 may include any of an emphasized display of the area where the width of the overlapping portion 63 differs from the theoretical value due to the occurrence of the shift or the distortion in the bird's-eye view video, an error message by a text, and numeral data indicating discrepancy from the theoretical value. When a certain level or more of the shift and the distortion is present in checking the calibration result of the bird's-eye view video, specifically, for example, when a portion is present where the width of the overlapping portion 63 differs from the theoretical value by the certain number of pixels, an alarm may be issued or the bird's-eye view video may become unavailable.

The display controller 28 synthesizes a plurality of videos and images that are supplied from the image processing unit 24 as needed, generates the display screen by adding necessary messages, supplies the display screen to the display 12, and controls displaying of the display screen. When the checking processing of the calibration result is performed, the display controller 28 supplies the determination result indicating whether the calibration is correctly performed or which area includes the shift and the distortion when the calibration is not correctly performed, the determination result being supplied from the image determination processing unit 27, to the display 12 together with the bird's-eye view video on which the superimposing image 62 is superimposed, and causes the display 12 to display them, based on the control of the controller 23.

The vehicle-mounted device 16 includes the video acquisition unit 21 that acquires the videos captured by the cameras 11, the light emission controller 25 that controls the light emission of the light beam pattern 42 by the light emitting device 14 irradiating the ground or a floor surface at the certain positions with respect to the vehicle 1 with the light beam pattern 42, the image processing unit 24 that generates the bird's-eye view video including the light beam pattern 42 the light emission of which is controlled by the light emission controller 25 using the videos acquired by the video acquisition unit 21, the superimposing image generation unit 26 that generates the superimposing image 62 at the position corresponding to the image 61 of the light beam pattern included in the bird's-eye view video generated by the image processing unit 24, and the image determination processing unit 27 that detects the overlapping portion 63 where the superimposing image 62 and the image 61 of the light beam pattern overlap in the bird's-eye view video on which the superimposing image 62 generated by the superimposing image generation unit 26 is superimposed and determines whether the camera parameters used for generating the bird's-eye view video are accurately calibrated. The vehicle-mounted device 16 can check the calibration result easily and accurately by performing the processing on the light beam pattern 42 irradiated at the certain positions and the bird's-eye view video including the image 61 of the light beam pattern without cumbersome work such as drawing a white lines (or attaching gummed tapes) at the certain positions around the vehicle 1 after a certain calibration using a marker or a calibration chart in the inspection at the car dealer, for example.

In the structure described above, many mechanisms conventionally provided to the vehicle 1 such as the respective constituting elements used for generating the surrounding video of the vehicle 1 for supporting the driver can be commonly used. As a result, the structure can be achieved with a low cost.

Figure 10:
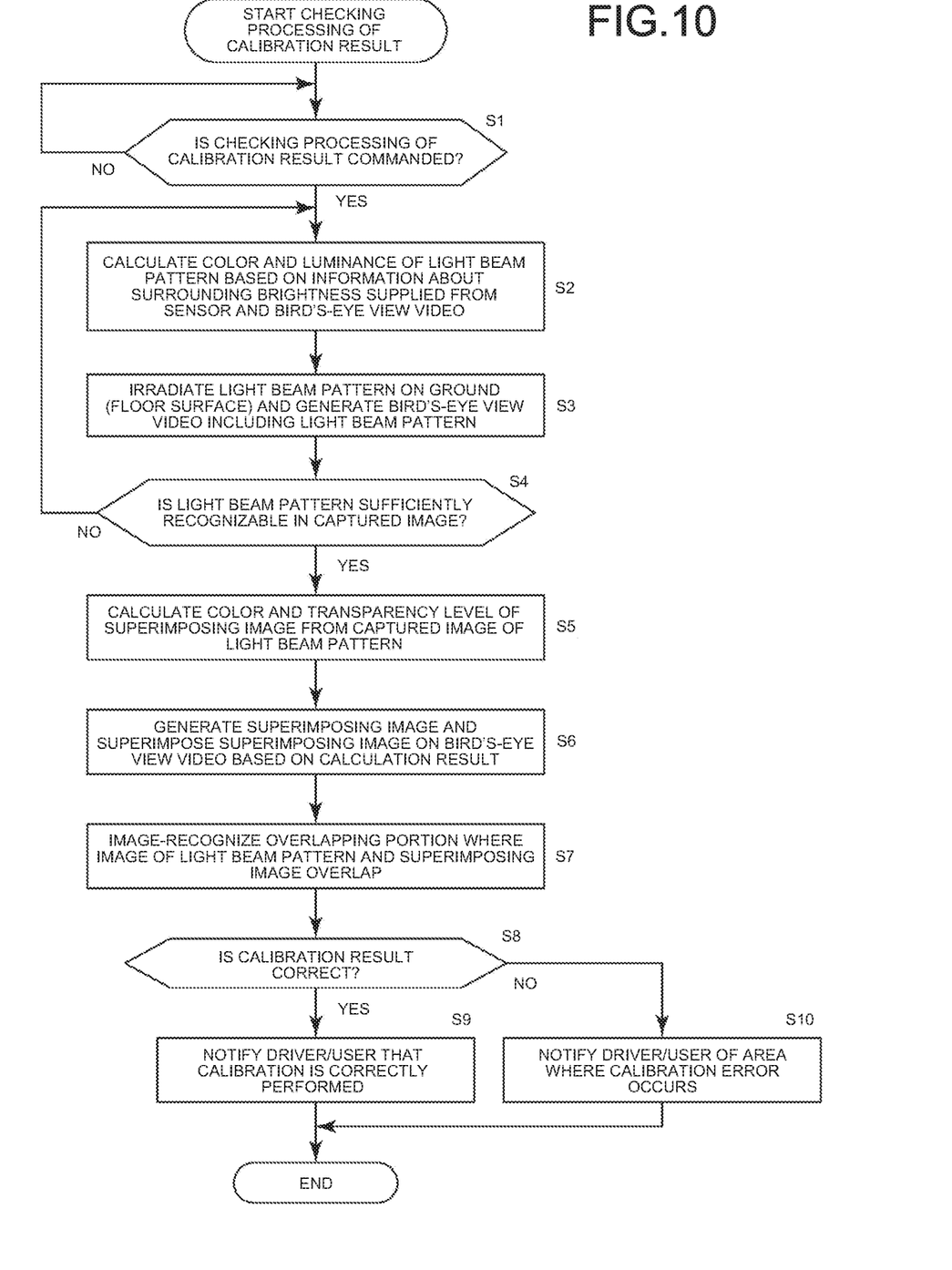
FIG. 10 is a flowchart for explaining checking processing of a calibration result.

The following describes the checking processing of the calibration result with reference to the flowchart in FIG. 10.

At step S1, the controller 23 determines whether the checking processing of the calibration result is commanded from the operation input unit 22. When it is determined that the checking processing of the calibration result is not commanded at step S1, the processing at step S1 is repeated until when it is determined that the checking processing of the calibration result is commanded.

When it is determined that the checking processing of the calibration result is commanded at step S1, the controller 23 commands, at step S2, starting of the checking processing of the calibration result to the image processing unit 24, the light emission controller 25, the superimposing image generation unit 26, the image determination processing unit 27, and the display controller 28. The image processing unit 24 performs the viewpoint conversion processing on the videos acquired by the video acquisition unit 21 to convert the videos into the videos viewed from the virtual bird's-eye viewpoint, performs the synthesizing processing on the resulting videos to generate the bird's-eye view video, and supplies the generated bird's-eye view video to the light emission controller 25 and the superimposing image generation unit 26. The light emission controller 25 calculates the color and the luminance of the light beam pattern 42 based on either the information about the surrounding brightness supplied from the sensor 13 or the bird's-eye view video supplied from the image processing unit 24, or both of them.

At step S3, the light emission controller 25 irradiates the light beam pattern 42 on the ground (floor surface) as described with reference to FIGS. 2 and 3 based on the calculation result of the processing at step S2. The image processing unit 24 generates the bird's-eye view video including the image 61 of the light beam pattern. At this timing, the light emission controller 25 controls the control device 15 such that the control device 15 operates the respective units of the vehicle 1 so as to irradiate the light beam pattern 42 at the certain positions when the respective units of the vehicle 1 need to be operated for determining whether the calibration is correctly performed, for example, in a case where the light emitting devices 14 are disposed at the lower portions of the door mirrors 41 as described with reference to FIG. 2.

At step S4, the light emission controller 25 determines whether the image 61 of the light beam pattern is sufficiently recognizable in the captured image based on the bird's-eye view video that is supplied from the image processing unit 24 and that includes the image 61 of the light beam pattern. At step S4, when it is determined that the image 61 of the light beam pattern is not sufficiently recognizable in the captured image, the processing returns to step S2, and the processing from step S2 onwards is repeated.

At step S4, when it is determined that the image 61 of the light beam pattern is sufficiently recognizable in the captured image, the superimposing image generation unit 26 calculates, at step S5, the color and the transparency level of the superimposing image 62 as described with reference to FIGS. 4 to 6, for example, from the captured image 61 of the light beam pattern based on the bird's-eye view video supplied from the image processing unit 24.

At step S6, the superimposing image generation unit 26 generates the superimposing image 62 based on the calculation result of the processing at step S5, and supplies the generated superimposing image 62 to the image processing unit 24. The image processing unit 24 superimposes the superimposing image 62 on the generated bird's-eye view video and supplies the resulting video to the image determination processing unit 27 and the display controller 28.

At step S7, the image determination processing unit 27 image-recognizes the overlapping portion 63 where the image 61 of the light beam pattern and the superimposing image 62 overlap as described with reference to FIGS. 7 and 8.

At step S8, the image determination processing unit 27 determines whether the calibration result is correct based on the width and the shape of the image-recognized overlapping portion 63.

At step S8, when it is determined that the calibration result is correct, the image determination processing unit 27 supplies, at step S9, information to notify a driver/user that the calibration is correctly calibrated to the display controller 28. The display controller 28 generates a message and an image that notify that the calibration is correctly calibrated, and supplies them to the display 12 together with the bird's-eye view video so as to cause the display 12 to display them, thereafter the processing ends.

At step S8, when it is determined that the calibration result is not correct, the image determination processing unit 27 supplies, at step S10, information to notify a driver/user of an area where the calibration error occurs to the display controller 28. The display controller 28 generates a warning message for notifying the incorrect calibration and an image displaying the area where the distortion and the shift occur, for example, and supplies them to the display 12 together with the bird's-eye view video so as to cause the display 12 to display them, thereafter the processing ends.

A calibration result determination method performed by the vehicle-mounted device 16 includes a light emission control step that controls the light emission of the light beam pattern 42, an image generation step that generates the bird's-eye view video including the light beam pattern 42 the light emission of which is controlled by the processing at the light emission control step using videos captured by the cameras 11, a superimposing image generation step that generates the superimposing image 62 at the position corresponding to the image 61 of the light beam pattern included in the bird's-eye view video generated by the processing at the image generation step, and an image determination step that detects the overlapping portion 63 where the superimposing image 62 and the image 61 of the light beam pattern overlap in the bird's-eye view video on which the superimposing image 62 is superimposed by the processing at the superimposing image generation step, and that determines whether the camera parameters used for generating the bird's-eye view video are accurately calibrated. The calibration result can be checked without cumbersome work such as drawing white lines (or attaching gummed tapes) at certain positions around the vehicle 1 after the certain calibration using a marker or a calibration chart in the inspection at the car dealer, for example.

The color and the intensity of the light beam pattern 42 used for checking the calibration result are set based on the color of the ground or the floor surface and the surrounding brightness. This eliminates a time for using different materials for constituting the white lines, for example, which serves as the linear structural objects used for the calibration, depending on the surrounding brightness and the color of the ground or the floor surface. The determination of whether the calibration result is correct is not performed in a visual manner, but is performed by the image processing, and the color and the transparency level of the superimposing image 62 used for the determination are set such that the overlapping portion 63 can be clearly determined based on the color and the intensity of the image 61 of the light beam pattern. This makes it possible to obtain the determination result with higher reliability than the determination result conventionally performed on the bird's-eye view image in a visual manner.

When the user of the vehicle 1 has an uncomfortable feeling about the bird's-eye view video, a state of the calibration of the camera parameters used for generating the bird's-eye view video can be checked by a simple processing. This makes it possible to prevent the bird's-eye view video in a state where the calibration is not correctly performed from being continuously used, and to easily determine whether the vehicle 1 needs to be brought to the car dealer for the calibration.

A series of the processes described above can be performed by hardware or software. When the series of the processes are performed by software, a computer program included in the software is installed from a computer program recording medium to a computer built in dedicated hardware or a general-purpose personal computer, for example, that can perform various functions by installation of various computer programs.

The computer program executed by the computer may be a computer program performing the processes in time series according to the orders described in this specification or a computer program performing the processes in parallel or necessary timing such as a call command.

The embodiments of the application are not limited to the embodiments described above. The embodiments can be modified various ways without departing from the spirit of the application.

A calibration result of camera parameters used for generating a bird's-eye view video can be checked easily and accurately by the application.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle device, comprising:
   a video acquisition unit configured to acquire videos captured by cameras configured to capture surroundings of a vehicle;
   a light emission controller configured to control light emission of a light beam pattern which is emitted by light emitting devices and with which the ground or a floor surface is irradiated at predetermined positions with respect to the vehicle;
   an image processing unit configured to generate, using the videos acquired by the video acquisition unit, a bird's-eye view video including the light beam pattern the light emission of which is controlled by the light emission controller;
   a superimposing image generation unit configured to generate a superimposing image at a position corresponding to the light beam pattern included in the bird's-eye view video generated by the image processing unit; and
   an image determination processing unit configured to detect, in the bird's-eye view video on which the superimposing image generated by the superimposing image generation unit is superimposed, an overlapping portion of the superimposing image and an image of the light beam pattern to determine whether camera parameters for generating the bird's-eye view video are accurately calibrated.

2. The vehicle device according to claim 1, wherein the light emission controller is further configured to perform a control such that a color of the light emission of the light beam pattern becomes a complementary color of a color of the ground or a color of the floor surface, or becomes a color similar to the complementary color.

3. The vehicle device according to claim 1, wherein the light emission controller is further configured to control an intensity of the light emission of the light beam pattern based on the bird's-eye view video generated by the image processing unit.

4. The vehicle device according to claim 1, wherein the light emission controller is further configured to acquire information about a brightness of the surroundings of the vehicle to control the intensity of the light emission of the light beam pattern based on the information about the brightness of the surroundings of the vehicle.

5. The vehicle device according to claim 1, wherein the superimposing image generation unit is further configured to determine a color and a transparency level of the superimposing image based on the color of the light emission of the light beam pattern included in the bird's-eye view video generated by the image processing unit.

6. A calibration result determination method that determines a calibration result of camera parameters for generating a bird's-eye view video of a vehicle, the calibration result determination method comprising:
   controlling light emission of a light beam pattern which is emitted by light emitting devices and with which the ground or a floor surface is irradiated at predetermined positions with respect to the vehicle:
   generating, using videos captured by cameras configured to capture surroundings of the vehicle, a bird's-eye view video including the light beam pattern the light emission of which is controlled at the controlling;
   generating a superimposing image at a position corresponding to the light beam pattern included in the bird's-eye view video generated at the generating of the bird's-eye view video; and
   detecting, in the bird's-eye view video on which the superimposing image generated at the generating of the superimposing image is superimposed, an overlapping portion of the superimposing image and an image of the light beam pattern to determine whether the camera parameters for generating the bird's-eye view video are accurately calibrated.

7. A non-transitory storage medium that stores a computer program that causes a computer mounted on a vehicle to perform processing comprising:
   controlling light emission of a light beam pattern which is emitted by light emitting devices and with which the ground or a floor surface is irradiated at predetermined positions with respect to the vehicle:
   generating, using videos captured by cameras configured to capture surroundings of the vehicle, a bird's-eye view video including the light beam pattern the light emission of which is controlled at the controlling;
   generating a superimposing image at a position corresponding to the light beam pattern included in the bird's-eye view video generated at the generating of the bird's-eye view video; and
   detecting, in the bird's-eye view video on which the superimposing image generated at the generating of the superimposing image is superimposed, an overlapping portion of the superimposing image and an image of the light beam pattern to determine whether the camera parameters for generating the bird's-eye view video are accurately calibrated.

* * * * *